United States Patent
Capps, Jr. et al.

(10) Patent No.: US 6,952,746 B2
(45) Date of Patent: Oct. 4, 2005

(54) METHOD AND SYSTEM FOR SYSTEM PERFORMANCE OPTIMIZATION VIA HEURISTICALLY OPTIMIZED BUSES

(75) Inventors: Louis Bennie Capps, Jr., Georgetown, TX (US); Scott Leonard Daniels, Cedar Park, TX (US); Bruce Mealey, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 502 days.

(21) Appl. No.: 09/881,922

(22) Filed: Jun. 14, 2001

(65) Prior Publication Data

US 2002/0194408 A1 Dec. 19, 2002

(51) Int. Cl.[7] .............................. G06F 13/00; G06F 3/00
(52) U.S. Cl. ........................... 710/104; 710/15; 710/29
(58) Field of Search .................. 710/109, 240–244, 710/113–116, 15–19, 29, 104

(56) References Cited

U.S. PATENT DOCUMENTS

| | | | | |
|---|---|---|---|---|
| 5,481,755 A | * | 1/1996 | Harper et al. ................... | 710/3 |
| 5,640,600 A | * | 6/1997 | Satoh et al. ................... | 710/33 |
| 5,751,978 A | | 5/1998 | Tipple ......................... | 395/309 |
| 5,838,681 A | * | 11/1998 | Bonomi et al. ......... | 370/395.41 |
| 5,848,266 A | | 12/1998 | Scheurich ................... | 395/558 |
| 5,890,014 A | | 3/1999 | Long ........................... | 395/828 |
| 5,951,664 A | | 9/1999 | Lambrecht et al. ......... | 710/124 |
| 6,009,476 A | | 12/1999 | Flory et al. .................. | 709/301 |
| 6,023,736 A | * | 2/2000 | Lambeth et al. .............. | 710/10 |
| 6,075,772 A | * | 6/2000 | Brown et al. ................. | 370/235 |
| 6,088,753 A | | 7/2000 | Sheafor et al. ............. | 710/128 |
| 6,108,734 A | | 8/2000 | Shand ......................... | 710/105 |
| 6,134,624 A | * | 10/2000 | Burns et al. ................. | 710/316 |
| 6,134,676 A | | 10/2000 | VanHuben et al. ........... | 714/39 |
| 6,363,445 B1 | * | 3/2002 | Jeddeloh ...................... | 710/113 |
| 6,397,287 B1 | * | 5/2002 | Brown et al. ............... | 710/305 |
| 6,502,212 B1 | * | 12/2002 | Coyle et al. .................. | 714/43 |

FOREIGN PATENT DOCUMENTS

| | | | | |
|---|---|---|---|---|
| DE | 19740514 C1 | 12/1998 | ........... | G06F/11/34 |
| JP | 57111621 A | 7/1982 | ........... | G06F/3/00 |
| JP | 60007553 A | 1/1985 | ........... | G06F/11/30 |
| JP | 5089032 A | 4/1993 | ........... | G06F/13/36 |
| JP | 10143460 A | 5/1998 | ........... | G06F/13/10 |
| JP | 2000041060 A | * 7/1998 | ........... | H04L/12/46 |

OTHER PUBLICATIONS

Foster, "Spreadsheet Approach for Early Optimization of Large Bus Switching Performance", IEEE Southern Tier Tech Conf Issue Cat. No. 90TH0313–7/New York, 1990, pp. 165–171, 281.

(Continued)

Primary Examiner—Mark H. Rinehart
Assistant Examiner—Trisha Vu
(74) Attorney, Agent, or Firm—Duke W. Yee; Mark E. McBurney; Francis Lammes

(57) ABSTRACT

A method and system for enhancing performance of a bus in a data processing system is described. The method includes monitoring priority of processes in an operating system queue along with data flow through adapters coupled to the bus in a data processing system, determining if increased bus performance is desirable, and adjusting bus parameters to enhance the performance of the bus if increased bus performance is desirable.

13 Claims, 4 Drawing Sheets

OTHER PUBLICATIONS

Marshall, "Building Stnardards Based COTS Multiprocessor Computer Systems for Space Around a High Speed Serial Bus Network", 17th DASC. AIAA/IEEE/SAE. Digital Avionics Systems Conference. Proceedings (Cat. No. 98CH36267), Pt. vol. 1, pp. D29/1–D29/8 vol. 1, Published New York, NY, USA, 1998 2 vol. (xi+xv+1444) pp., Abstract.

Bennett, "Break the Performance Bottlenecks in Today's Multiprocessor Designs", EDN (European Edition), vol. 39, No. 14, pp. 113–114, 117–118, 120, Jul. 7, 1994, Abstract.

Pleshek,"Intelligent Host Bus Adapters Increase SCSI–2 Bus Performance", I&CS, vol. 65, No. 3, pp. 41–43, Mar. 1992, Abstract.

Frank, "The Sbus: Sun's High Performance System Bus for RISC Workstations", COMPCON Spring '90: Thirty–Fifth IEEE Computer Society International Conference. Intellectual Leverage. Digest of Papers. (Cat. No. 90CH2843–1, pp. 189–194, Published Los Alamitos, CA, USA, 1990, Sponsored by IEEE, Abstract.

* cited by examiner

METHOD AND SYSTEM FOR SYSTEM PERFORMANCE OPTIMIZATION VIA HEURISTICALLY OPTIMIZED BUSES

RELATED APPLICATION

This application is related to commonly assigned and U.S. Patent series Ser. No. 08/835,129 entitled "Heuristic Bus Performance Optimization", filed on Apr. 4, 1997 and abandoned on Apr. 20, 1999.

BACKGROUND OF THE INVENTION

1. Technical Field

The present invention relates to method and system for enhancing bus performance, and particularly, to system performance optimization using the processing capabilities of an operating system (OS), as well as internal capabilities of adapters.

2. Description of Related Art

Currently, network computing is in wide use. The old form of a single, stand-alone computer system is no longer the only form of a computer system. Consequently, connectivity is one of the key system performance measures. This is especially true for server class systems. Network computing necessarily leads to a large number of communications in both inter-network and intra-network context.

Furthermore, a large number of mass storage adapters, which handle large amounts of rapid data flow, are also the result of network computing. These large numbers of mass storage adapters are not only dissimilar in their external protocol and unique design-based operating characteristics, but they also link a given system/server to dissimilar remote entities. In other words, the adapters have different types of hardware, and run on different applications.

In addition, the matter is made more complicated by the introduction of non-trivial bus hierarchies such as Peripheral Component Interconnect (PCI), PCI-X, which is a PCI bus with even more parameters, or InfiniBand. InfiniBand is an association-developed specification for computer input/output architecture by InfiniBand Trade Association (IBTA). In other words, the number of hardware parameters and input/output (I/O) slots per system increase constantly with each new model being introduced.

As can be appreciated, network speed or bandwidth increase demands for greater speed across network connections. It becomes desirable to have a method and system for enhancing bus performance of a computer that is at the other end of the network connections. By way of example, a server with an internal bus coupled to a network needs to have a means to accommodate a great amount of data flow from a network. Therefore, a better means to accommodate the data flow, after the data flows into the adapter, is significant. Currently, one problem commonly encountered is when the adapter needs more bandwidth in order to be more efficient but is unable to get the additional bandwidth. This may be because a related OS of a computer system cannot meet the requirement in that it either does not know more bandwidth is needed, the adapter is not equipped to convey the need, or the OS is not directly involved in meeting the need.

Known methods of adjusting bandwidth, such as manually flipping a dual in-line package (DIP) switch, or predefined bandwidth assignment at an application or software level, are in use. However, the known methods are limited by the fact that they are all restricted to methods that are internal to the adapter, or at most a monitor coupled to a local bus with the local bus coupled to the adapter. Thus, it would be beneficial to have a method and system that use an operating system (OS) independent of the adapter, as well as use internal capabilities of adapters for system performance optimization.

SUMMARY OF THE INVENTION

A method and system for enhancing performance of a bus in a data processing system is described. The method includes monitoring data flow through an adapter coupled to the bus in a data processing system, determining if increased bus performance is desirable; and handing off control to a code module which enhances the performance of the bus if increased bus performance is desirable.

The code module for heuristic bus optimization includes a performance optimizer unit, a hardware bus control unit coupled to the performance optimizer unit, and a process management unit managing at least one device driver.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
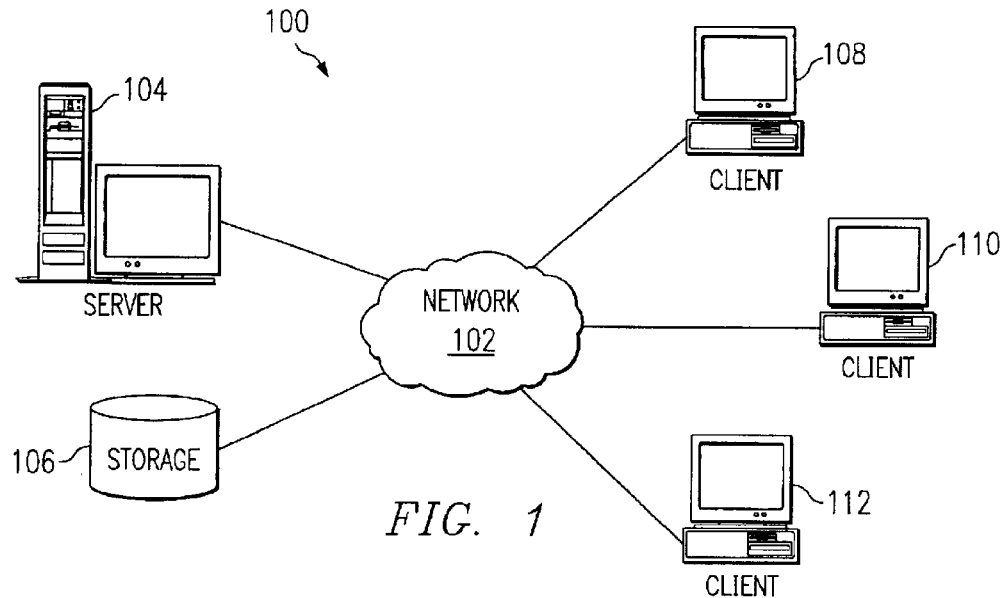
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
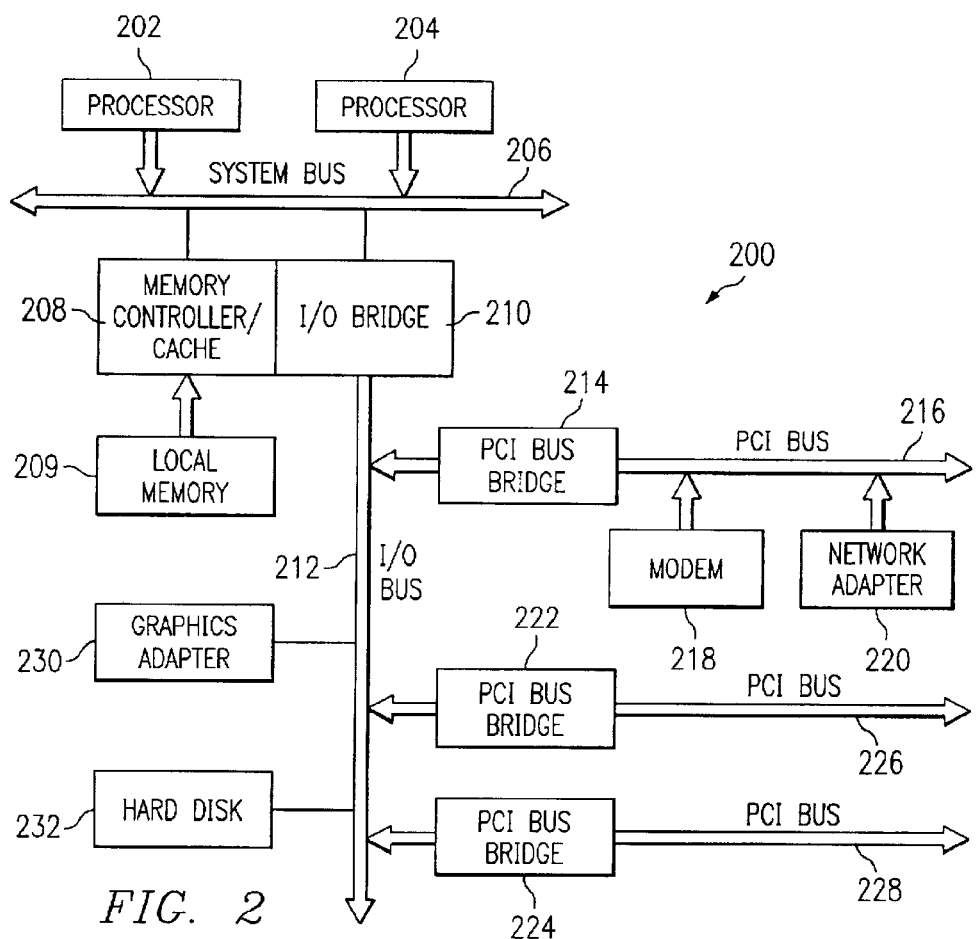
FIG. 2 depicts a data processing system that may be implemented as a server in which the present invention may be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
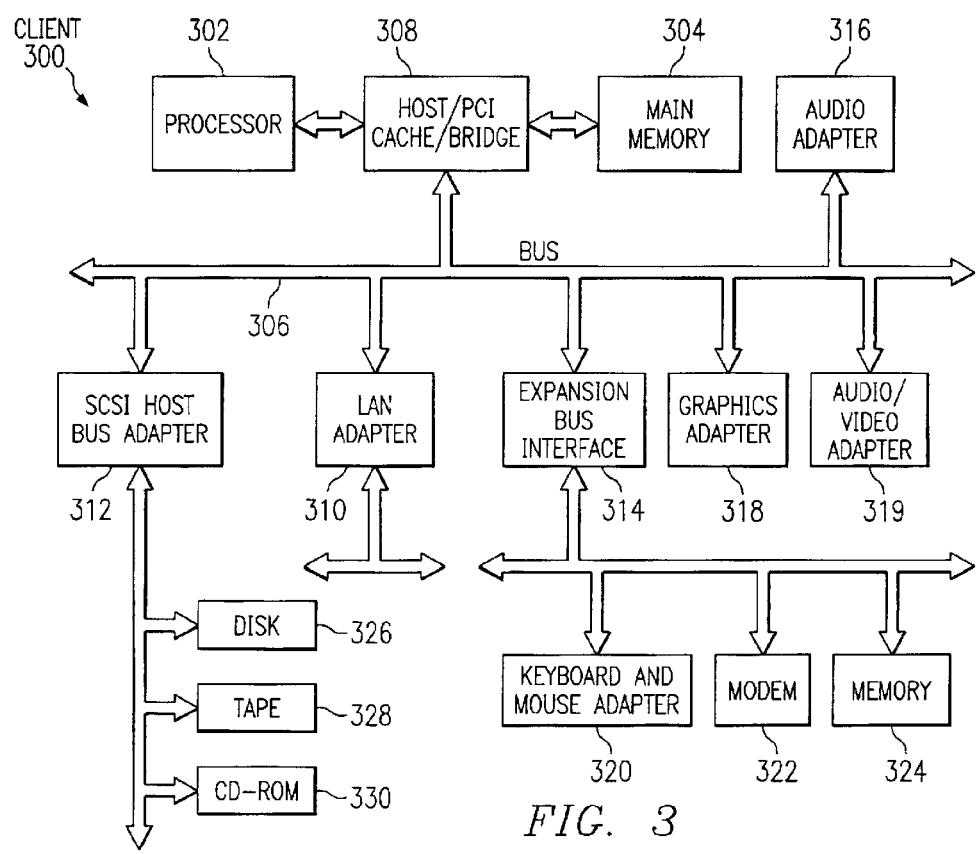
FIG. 3 depicts a block diagram illustrating a data processing system is depicted in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4A:
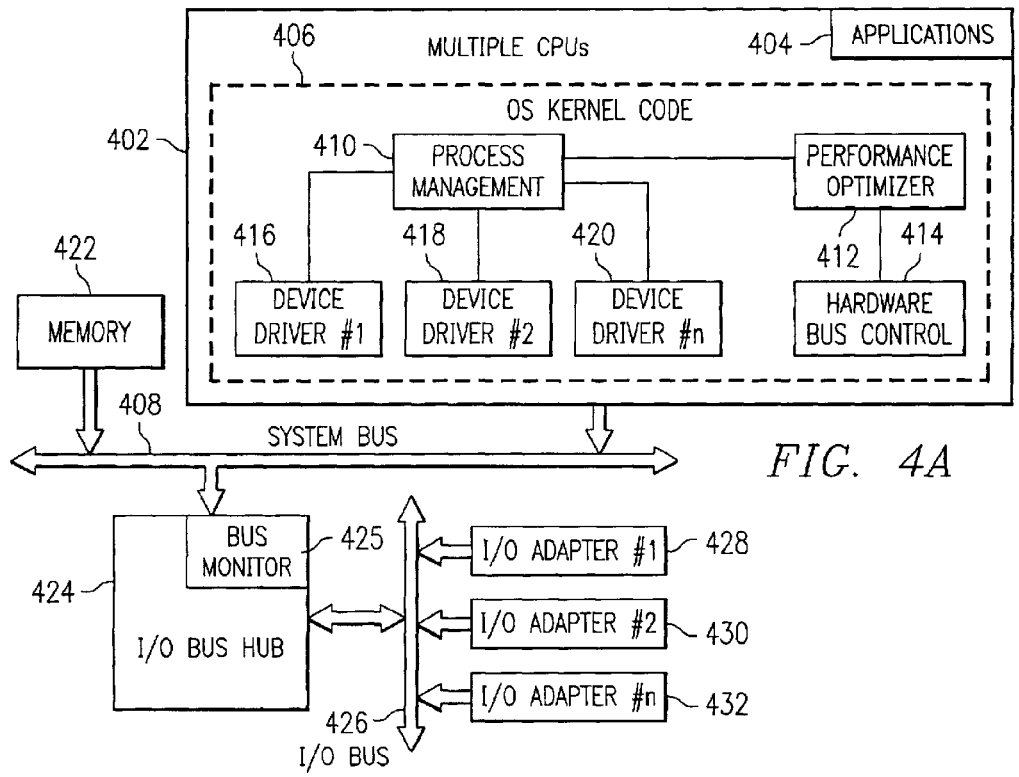
FIG. 4A depicts a block diagram of one embodiment of the invention, depicting both the hardware layout and some software relationship within a control unit, in which the present invention may be implemented.

Referring now to FIG. 4A, a block diagram of one embodiment of the invention, depicting both the hardware layout and some software relationship within a control unit, is described. A set of central processing unites (CPU) 402, also known as Multiple CPUs, wherein each CPU is dynamically coupled with other CPUs such that its internal processing structures can be considered as a whole. Multiple CPUs 402 includes applications 404 which may be a set of code structure or software at an application level. Multiple CPUs 402 further includes an operating system (OS) Kernel Code 406. Multiple CPUs 402 is coupled to a system bus 408.

Turning back to the operating system (OS) Kernel Code 406, it comprises a set of computer instruction for optimizing overall bus performance heuristically. In other words, operating system (OS) Kernel Code 406 enables a learning process whereby a bus system learns from past acts or events thereby optimizing bus performance. In addition, this heuristic process can be considered as a feedback process, which will be described infra. A process management 410 instructions, wherein a priority in regard to various devices, is logically coupled to a set of device drivers including device driver #1 416, device driver #2 418, and device driver #n 420. The device drivers in turn control their respective devices through various means including control through a set of bus parameters. A performance optimizer is logically coupled to process management 410 and hardware bus control unit 414 that controls the bus via a set of bus parameters.

A memory 422 couples to the system bus 408. An I/O bus hub 424 is coupled to the system bus 408 as well. I/O bus hub 424 also includes a bus monitor 425 that monitors buses. The buses that bus monitor 425 monitors includes system bus 408 as well as other bus described infra. I/O bus 426 couples I/O bus hub 424 and a set of I/O adapters together. The set of I/O adapters comprises I/O adapter #1 428, I/O adapter #2 430, and I/O adapter #n 432 each having a one-on-one relationship with device driver #1 416, device driver #2 418, and device driver #n 420 respectively.

As can be appreciated, the block diagram of FIG. 4A can either be applied to FIG. 2 or FIG. 3. In other words, the content of FIG. 4A is applicable to both server and client environments. Furthermore, each of the adapters, I/O adapter #1 428, I/O adapter #2 430, and I/O adapter #n 432, can be coupled to an outside high speed network (not shown) or another data processing system (not shown either) from time to time whereby bus optimization is definitely required.

Figure 4B:
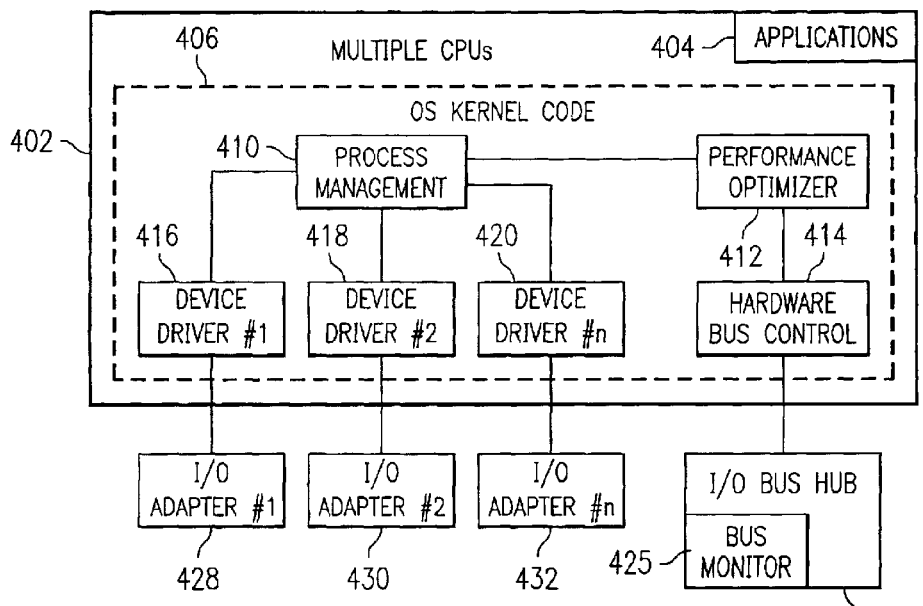
FIG. 4B depicts a block diagram of the invention described in FIG. 4A, depicting software relationship within the control unit, in which the present invention may be implemented.

Turning now to FIG. 4B, a block diagram of the one embodiment of the invention described in FIG. 4A, depicting software relationship within the control unit, is described. As in FIG. 4A, operating system (OS) Kernel Code 406 comprises a set of computer instruction for optimizing overall bus performance heuristically. In other words, operating system (OS) Kernel Code 406 enables a learning process whereby a bus system learns from past acts or events thereby optimizing bus performance. In addition, this heuristic process can be considered as a feedback process, which will be described infra. A process management 410 instructions, wherein a priority in regard to various devices, is logically coupled to a set of device drivers including device driver #1 416, device driver #2 418, and device driver #n 420. The device drivers in turn control their respective devices through various means including control through a set of bus parameters. A performance optimizer is logically coupled to process management 410 and hardware bus control unit 414 that controls bus via a set of bus parameters.

In addition to the description in FIG. 4A, each device driver, including device driver #1 416, device driver #2 418, and device driver #n 420, is logically coupled to a specific adapter among various adapters. The adapters can be I/O adapter #1 428, I/O adapter #2 430, and I/O adapter #n 432. In this way, the device driver controls I/O adapter through various bus parameters. The performance optimizer 412, by way of hardware bus control 414, is logically coupled to the I/O bus hub 424. Hardware bus control 414 further controls various bus parameters residing in I/O bus hub 424.

Figure 5:
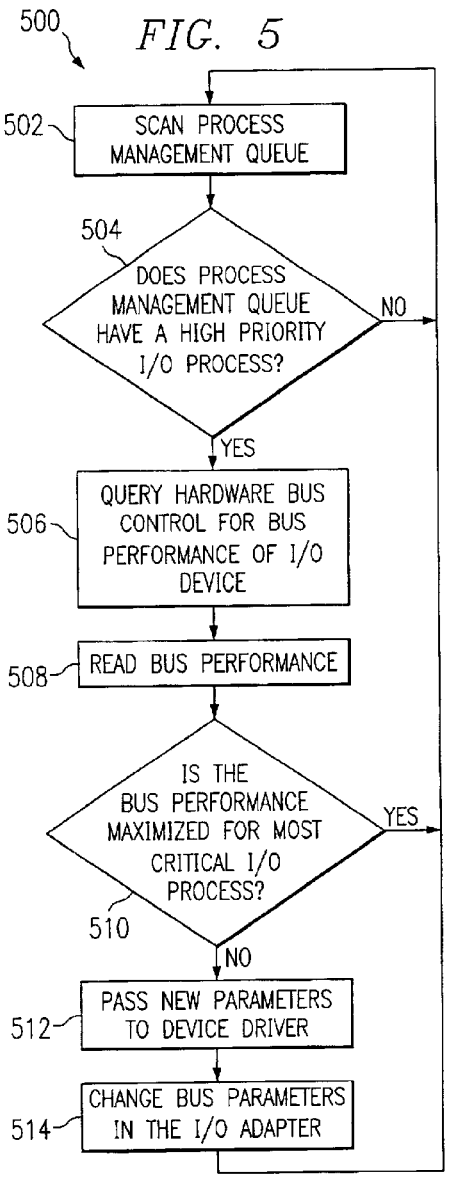
FIG. 5 depicts a flowchart illustrating an exemplary method for heuristically optimizing the performance of a bus.

Referring now to FIG. 5, a flowchart 500 depicting a heuristic bus optimization is described. A process management queue is scanned by the performance optimizer 412 (step 502). A determination is made by performance optimizer 412 (step 504) as to whether the process management queue includes at least one high priority I/O process. For example, the high priority I/O process can be an increase in input through an adapter among various adapters, or a large graphic file waiting to be printed. If there is no high priority I/O process in the queue, the logic flow leads back to step 502 wherein further scan is done for high priority I/O process. If there is a high priority I/O process, performance optimizer 412 queries hardware bus control 414 for bus performance of relevant I/O devices (step 506). For example, the relevant I/O devices can be any that are sharing an information flow channel with the high priority I/O process.

Hardware bus control 414 reads bus performance (step 508). The bus performance includes a set of values of various bus parameters. A determination is made (step 510) as to whether bus performance is optimized for the most critical I/O process. If the answer is yes, the logic flow leads back to step 502. If the answer is no, performance optimizer 412 passes new parameters to at least one device driver, including device driver #1 416, device driver #2 418, and device driver #n 420, changes some bus parameters in at least one I/O adapter, including I/O adapter #1 428, I/O adapter #2 430, and I/O adapter #n 432 (step 514). The flowchart 500 flows back, or feedback toward step 502 thereby a feedback loop is complete. In other words, the heuristic bus optimization process is a continuous process wherein an optimization point is optimized in a continuous basis, or at least at a predetermined set of points.

As an alternative, the optimization can be done on a periodical basis such that optimization is done at the end a fixed segment of time.

Figure 6:
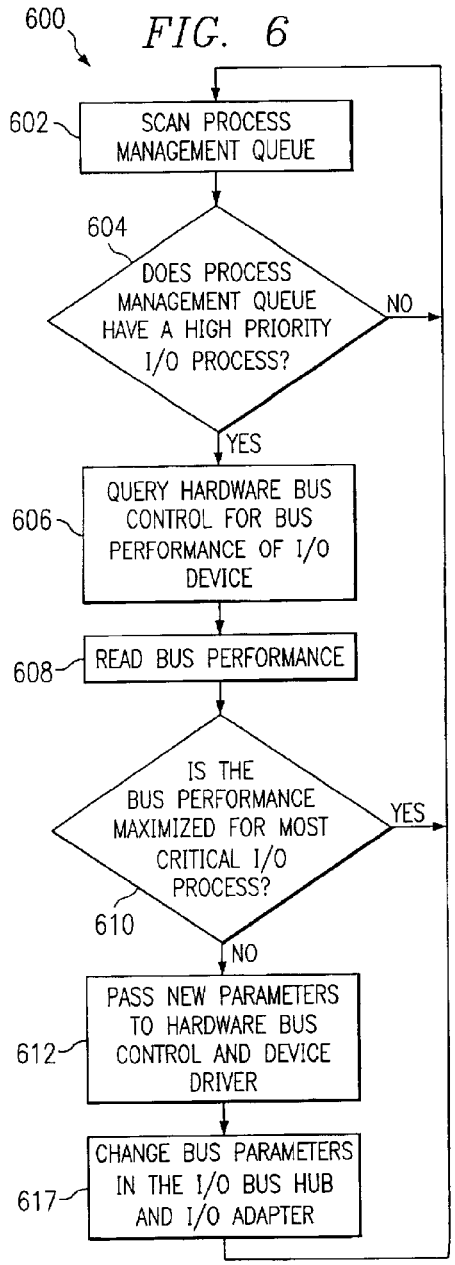
FIG. 6 depicts a flowchart illustrating another exemplary method for heuristically optimizing the performance of a bus.

Referring now to FIG. 6, a flowchart 600 depicting a similar heuristic bus optimization is described. A process management queue is scanned by the performance optimizer 412 (step 602). A determination is made by performance optimizer 412 at step 604 as to whether the process management queue includes at least one high priority I/O process. For example, the high priority I/O process can be an increase in input through an adapter among various adapters, or a large graphic file waiting to be printed. If there is no high priority I/O process in the queue, the logic flow leads back to step 602 wherein further scan is done for high priority I/O process. If there is a high priority I/O process, performance optimizer 412 queries hardware bus control 414 for bus performance of relevant I/O devices (step 607). For example, the relevant I/O devices can be any are sharing an information flow channel with the high priority I/O process.

Hardware bus control 414 reads bus performance (step 608). The bus performance includes a set of values of various bus parameters. A determination is made at step 610 as to whether bus performance is optimized for the most critical I/O process. If the answer is yes, the logic flow leads back to step 602. If the answer is no, performance optimizer 412 passes new parameters to hardware bus control 414, as well as passes new parameters to at least one device driver via process management 410 (step 612).

At this juncture, bus parameters in the I/O bus hub 424 are changed through instructions issued by the hardware bus control 414 (step 617). In addition, at least one device driver, including device driver #1 416, device driver #2 418, and device driver #n 420, changes some bus parameters in at least one I/O adapter, including I/O adapter #1 428, I/O adapter #2 430, and I/O adapter #n 432 (step 514). The flowchart 600 flows back, or feedback toward step 602 thereby a feedback loop is complete. In other words, the heuristic bus optimization process is a continuous process wherein an optimization point is optimized in a continuous basis, or at least at a predetermined set of points.

As an alternative, the optimization can be done on a periodical basis such that optimization is done at the end a fixed segment of time.

In addition to the process listed above, an operating system priority process normally residing in process management 410, is operating in parallel that reorders the Process Management queue so that high priority I/O processes move to the top, thus designating a priority as to which adapter has the right to be ranked above others. Along with the process priorities contained within Process Management 410, within the Performance Optimizer 412, a system specific portion of bandwidth is made variable and is assigned between adapters based upon the priority registered with the OS by their device drivers. As a result, required adjustments relating to bandwidth are determined each time the priority changes. In addition, the adjustments can be done on a periodic basis. That is to say, the adjustments are done after a predetermined time segment. As can be appreciated, the above are higher level, or software related actions. After the above actions or, more specifically adjustments, are done, relevant hardware actions are needed. In other words, hardware is being driven such that specific adapters or adapter are given more bandwidth. Thus, this invention represents a synergy between software and hardware. In other words, a dynamic overlap exists between software and hardware domains.

The above flowcharts 500 and 600 can be better explained by way of an example. For instance, an application is driving I/O transactions through an Ethernet I/O device to service a user's application. The user determines that this application is the most critical on the system and boosts the priority of the changing hardware fitting application, indirectly boosting the priority of the application's processes including any processes that issue I/O through the Ethernet adapter. At this point, the application issues an I/O process which becomes high priority based on the previous actions. While the performance optimizer is scanning all running applications, it is determined that there is a high priority Ethernet I/O that can be assisted by boosting bus performance. In turn, the Performance Optimizer 412 changes hardware settings for the buses and bridges upstream of that adapter in small steps, or incremental ranges, along the direction that is dictated by the Performance Optimizer, until the optimal performance point is reached. Later, as the system load/application changes, bus or buses can be optimized again or re-optimized. In fact, this optimization process is dynamic and continuous. It is conceptually analogous to a feedback control principle in that the system dynamically adjusts itself until an optimal state is achieved.

It is noted that parameters or bus performance factors include arbitration scheme, latency timers, etc. As can be appreciated, the net goal of any bus performance optimization is to maximize the overall system performance. The need to have such a system of heuristic optimization grows as we move from PCI to PCI-X, and then on to InfiniBand. In these environments, additional levers are provided to tune the system, but an automated method is needed to optimize or "squeeze out" system performance that is normally lost and also to keep the system at its optimum performance level for any system configuration or application. In a network computing environment, performance of I/O subsystem becomes as important as the performance of a central processing unit (CPU). This is especially true for a server such as the one depicted in FIG. 2.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for enhancing performance of a bus in a data processing system, comprising:
   monitoring data flow through an adapter coupled to the bus in a data processing system;
   determining if increased bus performance is desirable;
   determining whether performance of the bus is a function of an external device connected to the adapter; and
   handing off control to a code module which enhances performance of the bus if increased bus performance is desirable.

2. The method of claim 1, further comprising: determining the performance by examining prior throughput of data of the adapter.

3. The method of claim 1, further comprising:
   changing, in small incremental steps, hardware settings upstream to the adapter; and
   after an optimum performance point is achieved, maintaining current state.

4. The method of claim 1, further comprising:
   reaching a decision based upon prior performance parameters of other devices coupled to the bus.

5. The method of claim 1, further comprising:
   determining a priority of a set of adapters, including the adapter, coupled to the bus.

6. The method of claim 5, further comprising:

changing the priority throughput of at least one of the set of adapters.

7. The method of claim 1, further comprising:

simultaneously monitoring throughput of the adapter.

8. A system for optimizing the performance of a bus, comprising:

a first bus coupled to at least one central processing limit (CPU) having a code module embedded therein;

at least one input/output (I/O) adapter coupled to the first bus;

a driver for the at least one input/output (I/O) adapter residing in the at least one central processing unit (CPU); and a bus monitor coupled to a hardware bus control unit residing in the code module wherein information acquired by the bus monitor is processed, a determination is made as to whether the performance of the bus is a function of an external device connected to the input/output adapter, and a decision is made to increase adapter throughput.

9. The system of claim 8, further comprising a second bus disposed to be monitored by the bus monitor, and connected to the at least one input/output (I/O) adapter.

10. The system of claim 8, wherein the code module comprises:

a performance optimizer unit, wherein a process management queue is scanned, a determination as to weather the process management queue have a high priority I/O process;

a process management limit coupled to the performance optimizer unit; and a hardware bus control unit, wherein bus performance is being read, coupled to the performance optimizer unit.

11. The system of claim 10, further comprising device driver, wherein at least one bus parameter in the I/O adapter is changed, coupled to the process management unit.

12. The system of claim 10, wherein the hardware bus control unit changes at least one bus parameter.

13. The system of claim 8, wherein the hardware bus control unit is coupled to an I/O bus hub.

* * * * *

UNITED STATES PATENT AND TRADEMARK OFFICE
CERTIFICATE OF CORRECTION

PATENT NO. : 6,952,746 B2
DATED : October 4, 2005
INVENTOR(S) : Capps, Jr. et al.

It is certified that error appears in the above-identified patent and that said Letters Patent is hereby corrected as shown below:

Column 9,
Line 8, after "processing" delete "limit" and insert -- unit --.

Column 10,
Line 7, after "as to" delete "weather" and insert -- whether --.
Line 10, after "management" delete "limit" and insert -- unit --.

Signed and Sealed this

Thirteenth Day of June, 2006

JON W. DUDAS
*Director of the United States Patent and Trademark Office*